US 6,668,909 B2
(12) United States Patent
Vincent

(10) Patent No.: US 6,668,909 B2
(45) Date of Patent: Dec. 30, 2003

(54) AIR-CONDITIONING DEVICE FOR MOTOR VEHICLE

(75) Inventor: Philippe Vincent, Epernon (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/959,153

(22) PCT Filed: Feb. 21, 2001

(86) PCT No.: PCT/FR01/00497

§ 371 (c)(1),
(2), (4) Date: Oct. 18, 2001

(87) PCT Pub. No.: WO01/62530

PCT Pub. Date: Aug. 30, 2001

(65) Prior Publication Data

US 2002/0157811 A1 Oct. 31, 2002

(30) Foreign Application Priority Data

Feb. 22, 2000 (FR) .............................. 00/02163

(51) Int. Cl.⁷ ............................................. B61D 27/00
(52) U.S. Cl. .................. 165/42; 165/203; 454/160; 454/161
(58) Field of Search ............................ 165/42, 43, 203; 454/156, 160, 161

(56) References Cited

U.S. PATENT DOCUMENTS

| 4,460,036 A | * | 7/1984 | Yoshimi et al. ........... 165/42 X |
| 4,482,009 A | * | 11/1984 | Nishimura et al. ......... 165/203 |
| 5,186,237 A | * | 2/1993 | Adasek et al. ................ 165/42 |
| 5,463,967 A | * | 11/1995 | Gielow et al. |
| 5,983,987 A | * | 11/1999 | Weindorf ...................... 165/42 |
| 5,988,263 A | | 11/1999 | Schwarz |
| 6,296,563 B1 | * | 10/2001 | Vincent ........................ 454/121 |
| 6,453,991 B1 | * | 9/2002 | Tsurushima et al. ......... 165/202 |
| 6,475,077 B2 | * | 11/2002 | Arold ........................ 165/42 X |
| 6,547,433 B2 | * | 4/2003 | Yazici et al. |
| 6,581,678 B1 | * | 6/2003 | Groemmer et al. ....... 165/43 X |
| 6,588,496 B2 | * | 7/2003 | Nakagawa et al. ........... 165/42 |
| 2003/0042011 A1 | * | 3/2003 | Vincent ....................... 165/203 |
| 2003/0045224 A1 | * | 3/2003 | Vincent ....................... 454/156 |

FOREIGN PATENT DOCUMENTS

| DE | 196 46 123 A1 | * 5/1998 | ................. 165/42 |
| DE | 199 08 998 A1 | 9/1999 | |
| DE | 100 31 534 A1 | * 1/2001 | |
| EP | 0 936 090 A2 | 8/1999 | |
| FR | 2 795 684 | * 1/2001 | |
| JP | A-62-225414 | 10/1987 | |

* cited by examiner

Primary Examiner—Ljiljana Ciric
(74) Attorney, Agent, or Firm—Liniak, Berenato & White

(57) ABSTRACT

An air-conditioning device for a vehicle comprising in a housing (13) a first conduit (20) for transmitting a cool air flow (F1) and a second conduit (22), wherein is installed a heat exchanger (24) for transmitting a warm air flow (F2). The conduits (20, 22) are interposed between an air intake (14) and a mixing zone (31) delivering mixed air. A system splitting (40) the air flows (F1, F2), delivered by the conduits (20, 22) is provided at the junction of the two conduits and in the second conduit (22) downstream of the heat exchanger (24). The splitting system (40) comprises transversely alternating a plurality of cool air passages (46) and a plurality of warm air passages (49). The passages emerge into two separate mixing zones (31, 25).

15 Claims, 13 Drawing Sheets

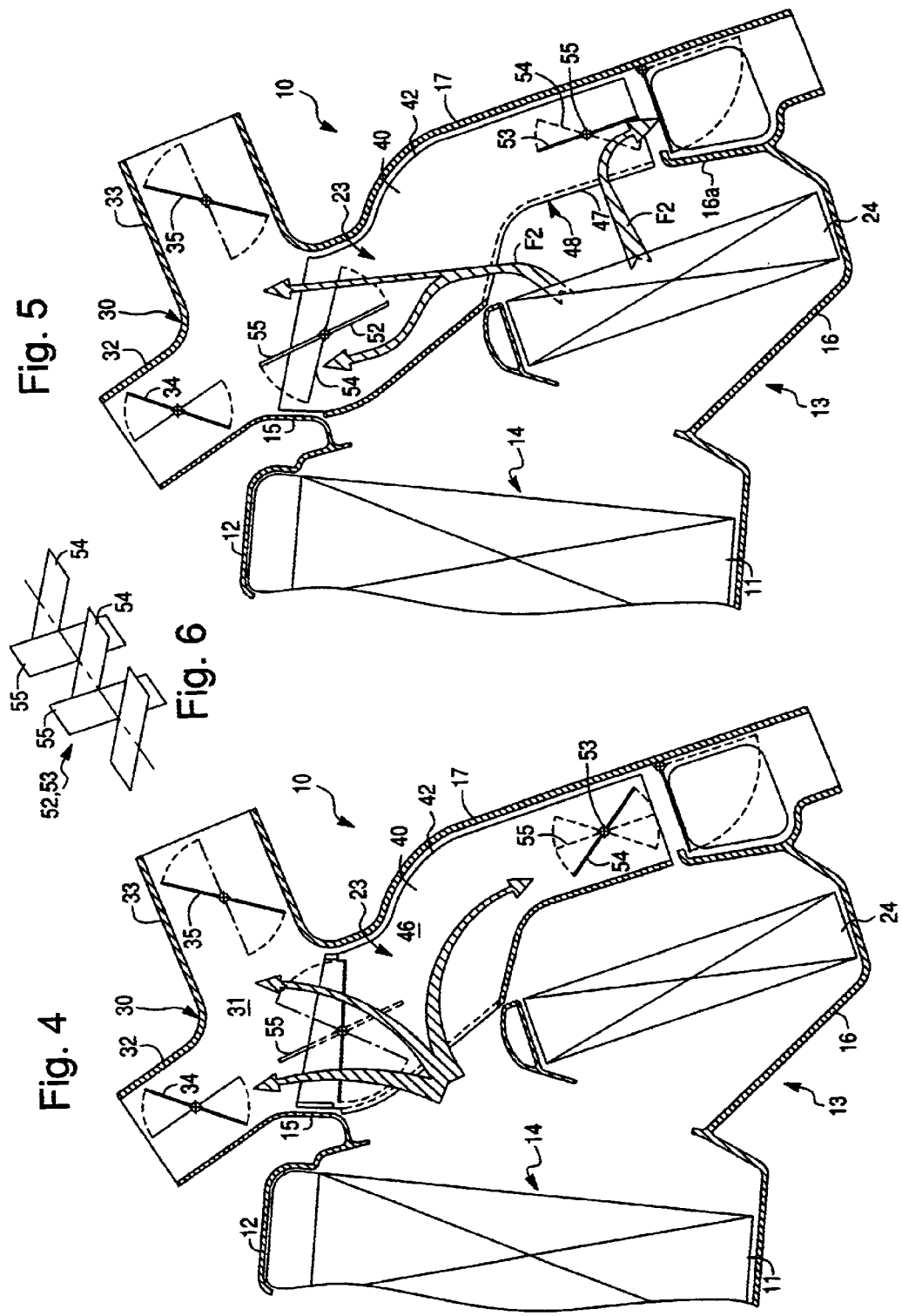

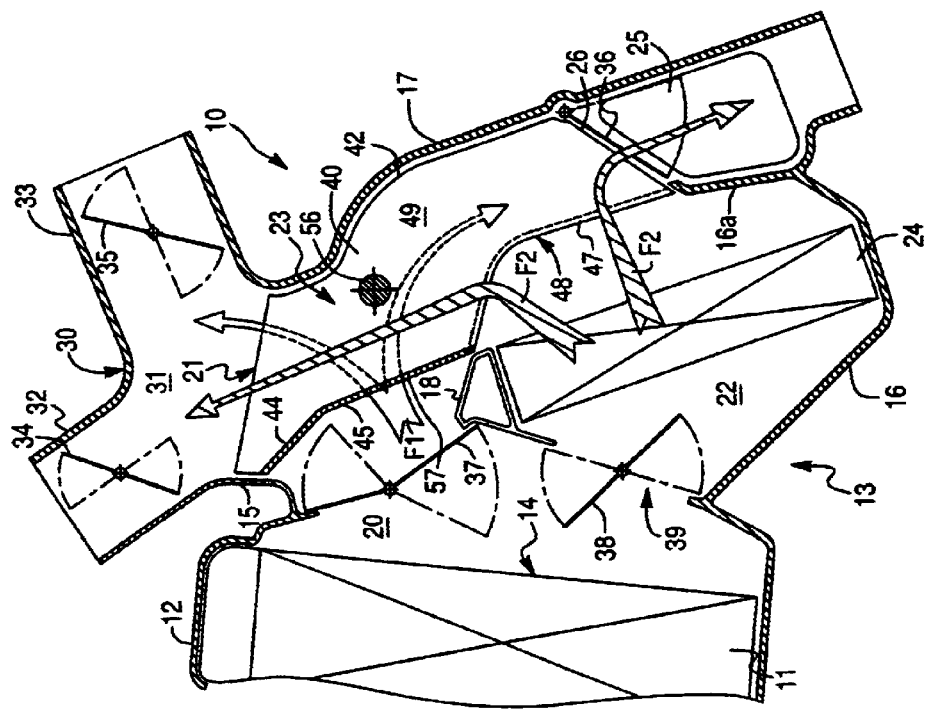
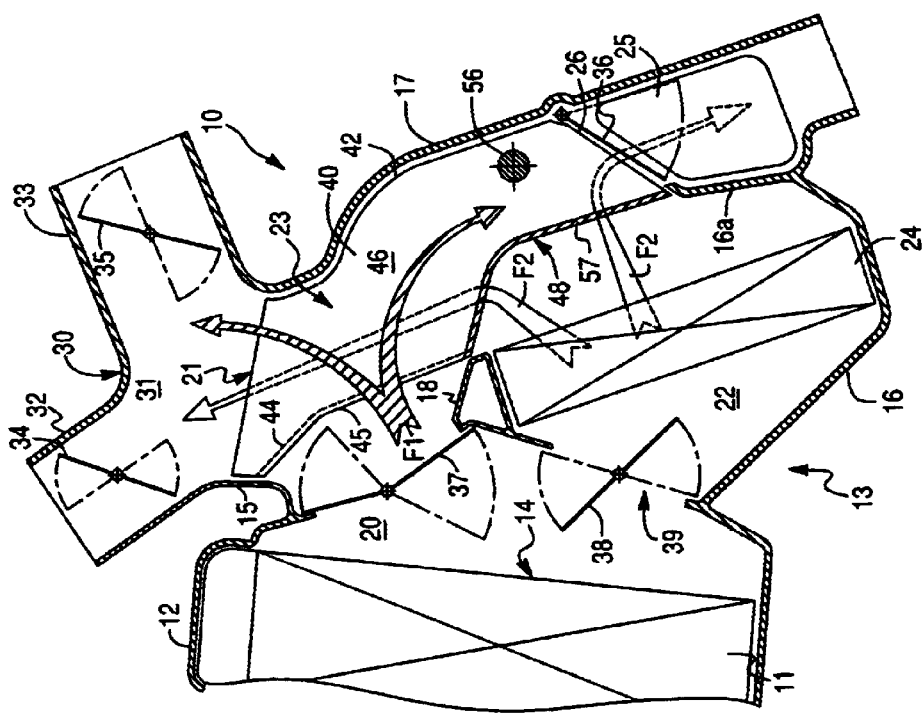

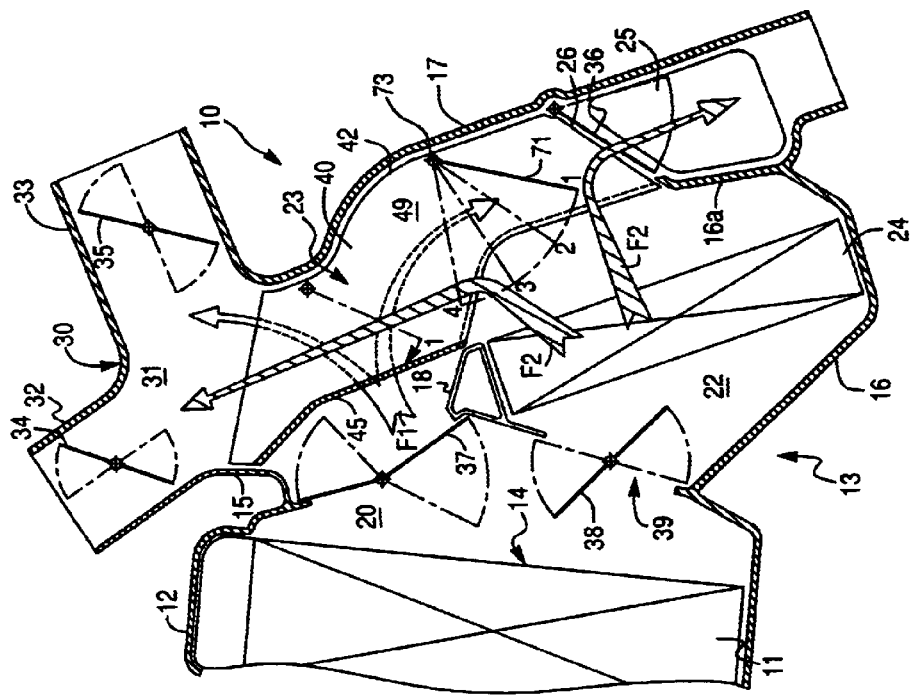
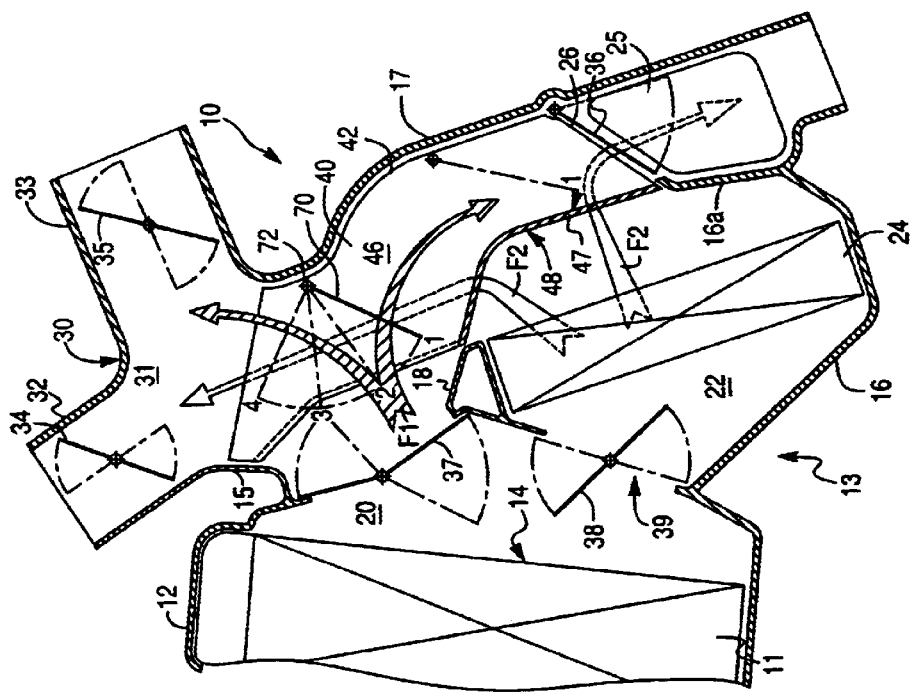

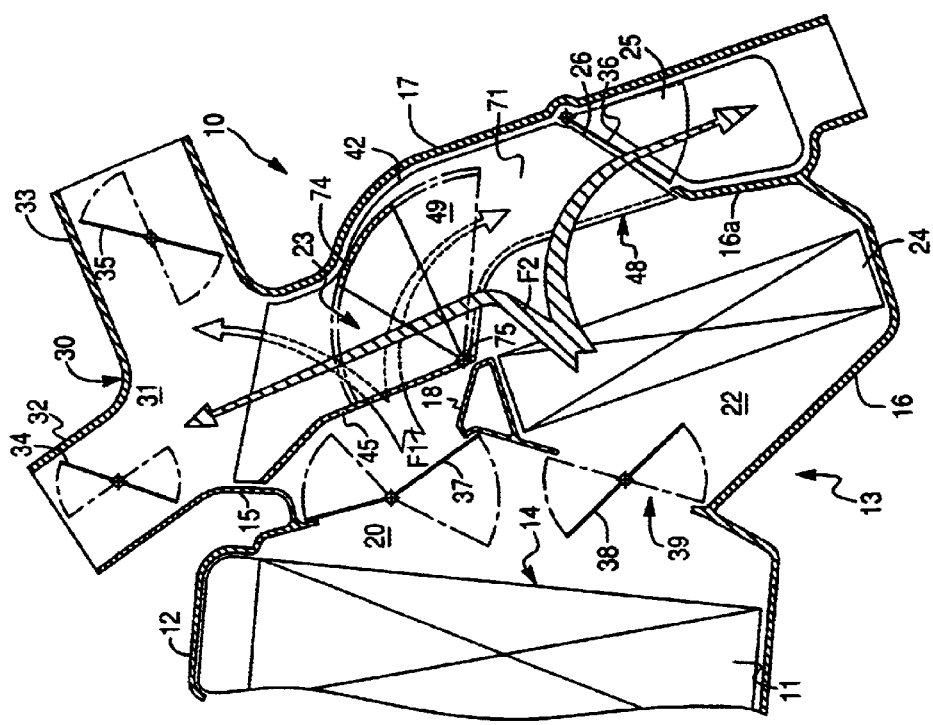
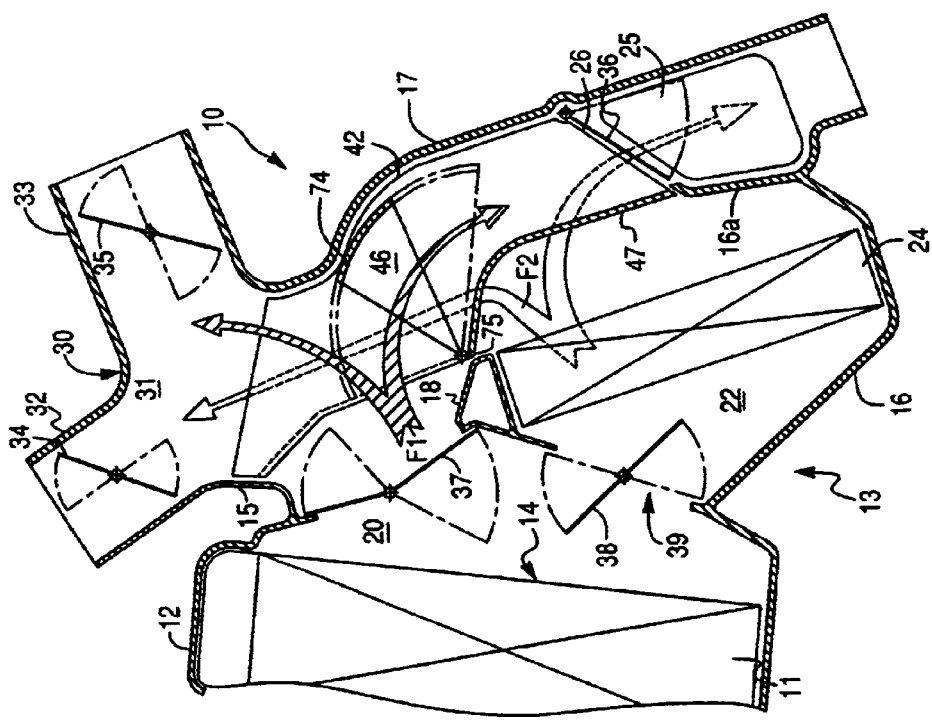

AIR-CONDITIONING DEVICE FOR MOTOR VEHICLE

BACKGROUND OF THE INVENTION

1. Field of the Invention.

The invention relates to the field of air-conditioning apparatus, especially for motor vehicles.

2. Description of Related Art

The air-conditioning apparatus for vehicles generally includes an air-inlet duct fed selectively with outside air or with recycled air taken up from the passenger compartment, in which are mounted a blower and an evaporator, an air-conditioning casing receiving the cold air from the evaporator and including a cold-air transmission duct and a bypass duct in which is mounted a heat exchanger, these two ducts joining together in a mixing region intended to deliver air at the required temperature, and a distribution casing receiving the air from the mixing region and delivering it to various air-diffusion vents provided in the passenger compartment.

In the conditioning casing, a mixing flap is provided in order to share out the cold air delivered by the evaporator between a cold flow and an airflow passing through the heat exchanger. In an extreme position of this flap, all the air travels through the heat exchanger and, in another extreme position, no air travels through the exchanger.

The air-mixing region situated at the intersection of the cold-air duct and of the heating duct receives a cold-air flow and a hot-air flow at different speeds and in different directions. These two airflows would have to be mixed intimately, in order for the mixing region to deliver air at a uniform temperature.

However, it is observed that stratification of the air occurs. At the outlet from the mixing region, the air is colder on the cold-air-duct side and hotter on the bypass-duct-outlet side. In the distribution casing, the ducts for delivering air to the aeration vents are connected in such a way that the foot-aeration ducts, also called heating ducts, receive hotter air than that feeding the central or lateral aeration ducts of the passenger compartment. However, in general, the de-icing ducts receive colder air than that delivered by the aeration vents, which does not encourage demisting of the windscreen.

The mixing region is usually arranged in the upper part of the air-conditioning casing. The foot-aeration ducts, or more generally the ducts for aerating the lower regions of the passenger compartment and the rear region, therefore extend over the entire height of the said casing, and take up a not inconsiderable amount of space.

In certain air-conditioning apparatus, two mixing regions are provided, an upper mixing region intended to supply air to the de-icing vents and to the central and lateral aeration vents mounted on the dashboard, and a lower mixing region intended for supplying conditioned air into the lower part and the rear part of the passenger compartment. In other apparatus, the upper mixing region is intended for the front diffusion (de-icing, central and lateral aeration, front passengers' feet), and the lower mixing region is intended for the diffusion to the rear of the passenger compartment. In this case, a supplementary duct is provided for transmitting cold air into the air-conditioning casing in order to feed this second mixing region. The heating duct is arranged between the two cold-air transmission ducts and supplies the two mixing regions with hot air. The additional duct also takes up a not inconsiderable amount of space, and it is necessary to provide a second mixing system in order to control the temperature of the air in the second mixing region, and a number of anti-return flaps.

SUMMARY OF THE INVENTION

The object of the invention is to propose an air-conditioning device for a motor vehicle which makes it possible to feed two mixing regions with a single mixing system, without requiring anti-return flaps and while ensuring homogenisation of the temperatures in each of the mixing regions.

The object of the invention is also to make the air circuit to the lower part of the apparatus more permeable and thus to benefit from a more substantial air throughput.

The object of the invention is also to propose a device for conditioning the air of the passenger compartment of a vehicle, which is compact, easy to produce and easy to assemble.

The invention therefore relates to a device for heating, ventilating and/or air-conditioning the passenger compartment of a motor vehicle, of the type including, in a casing, a first duct for transmitting a cold-air flow and a second duct, in which a heat exchanger is installed, for transmitting hot air, the said ducts being interposed between an air inlet and a mixing region delivering the mixed air.

According to the invention, this device is characterised in that it further includes an airflow-divider system which shares out the cold-air flow delivered by the first duct and the hot-air flow delivered by the second duct into a number of secondary flows, this divider system including, transversely and alternately, a number of cola-air passages having their inlets in the first duct and a number of hot-air passages having their inlets in the second duct, and in that the said passages feature a first series of outlets alternately delivering cold air and hot air into a first mixing region and a second series of outlets alternately delivering hot air and cold air into a second mixing region.

Advantageously, the airflow-divider system includes a number of parallel plates arranged transversely in the casing, at the junction of the first duct and of the second duct, these plates being linked in pairs in the first duct and the second duct by means of junction walls, so as to define the inlets of the cold-air passages in the first duct and the inlets of the hot-air passages in the second duct.

The following provisions are furthermore preferably adopted:

- the plates, between the two series of outlets, includes edges attached to a transverse wall of the casing;
- the said plates have an oblong shape and extend downstream of the heat exchanger in the second duct and across the outlets of the first duct and of the second duct;
- the two mixing regions are arranged respectively at the extremities of the said plates.

BRIEF DESCRIPTION OF THE DRAWINGS

Other advantages and characteristics of the invention will emerge on reading the following description given by way of example and by referring to the attached drawings, in which:

FIGS. 4 and 5 are similar to FIGS. 1 and 2 and show an air-conditioning device in which the mixing flaps are mounted in the divider system;

FIG. 6 shows, in perspective, a mixing flap of the conditioning device of FIGS. 4 and 5;

FIGS. 8 and 9 are similar to FIGS. 1 and 2 and show a divider system some of the walls of which include orifices;

FIGS. 20 and 21, similar to FIGS. 1 and 2, show an air-conditioning device equipped with means for adjusting the hot and cold air throughputs assigned to each mixing chamber;

FIGS. 22 and 23 show a variant of the adjusting means of FIGS. 20 and 21;

DETAILED DESCRIPTION OF PREFERRED EMBODIMENTS

Figure 1:
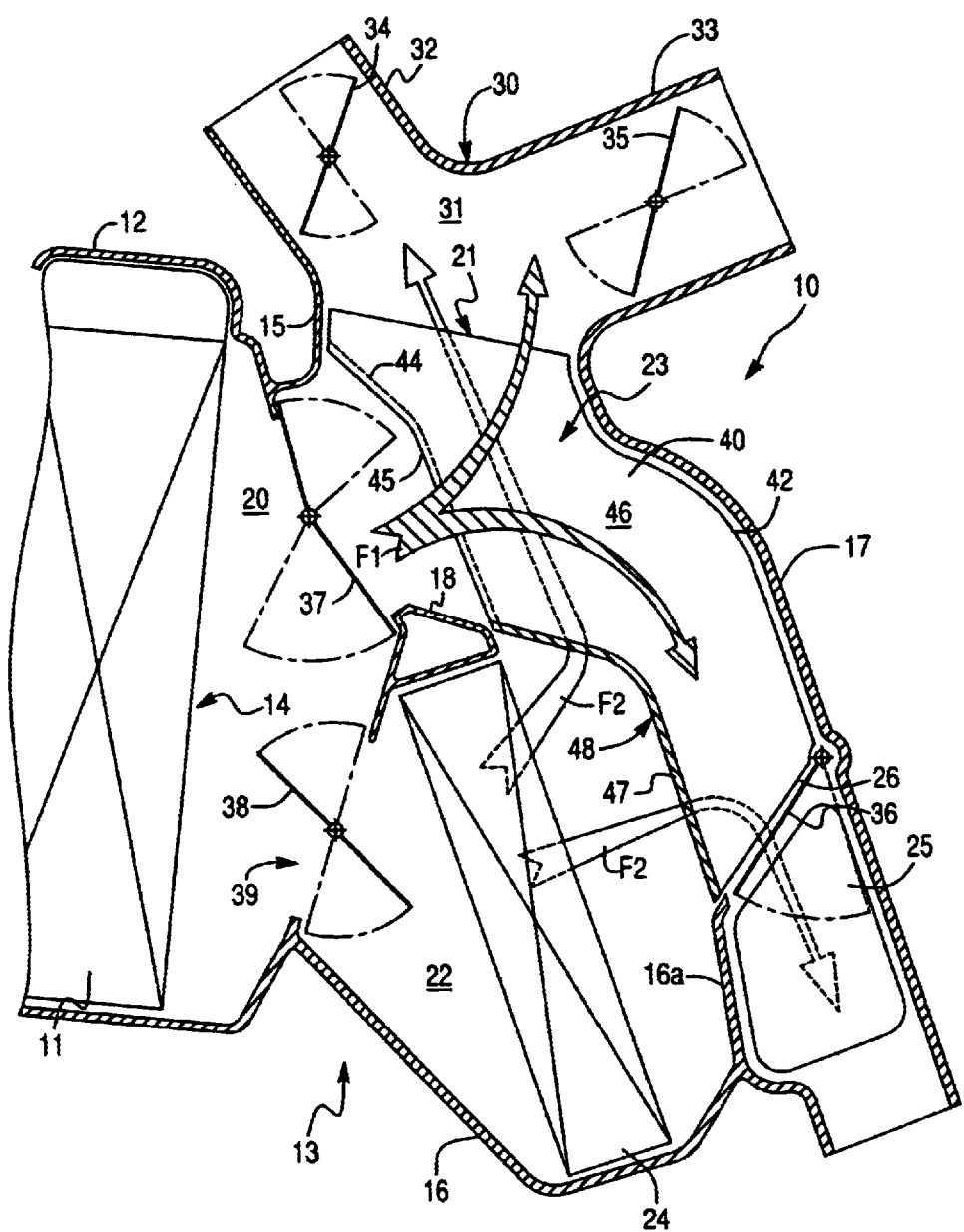
FIG. 1 is a sectional view of an air-conditioning device according to the invention, this section being taken along the median plane of a cold-air passage of the flow-divider system.
Figure 2:
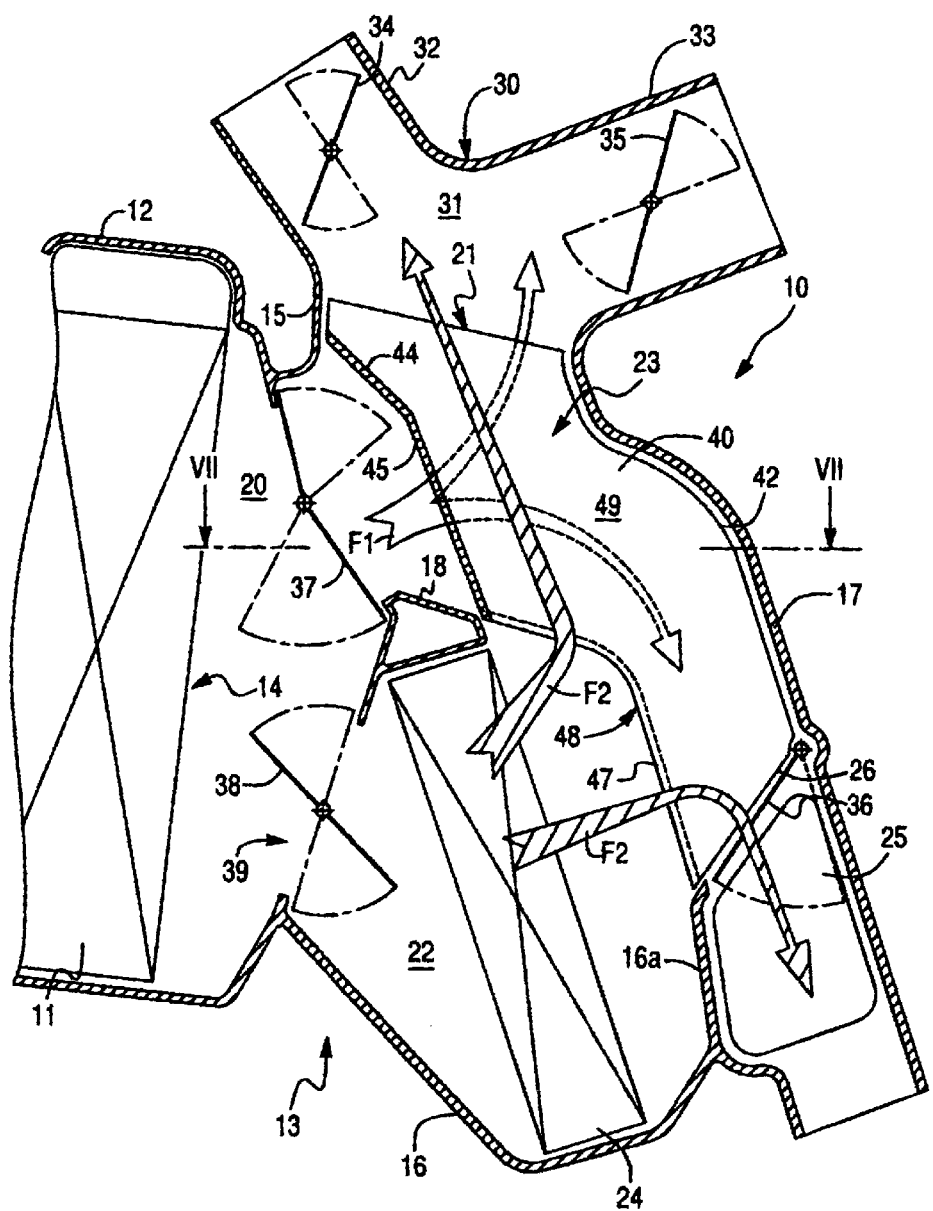
FIG. 2 is similar to FIG. 1, but this section is along a median plane of a hot-air passage of the flow-divider system.

FIGS. 1 and 2 show an air-conditioning device 10 for a vehicle, which includes, downstream of an evaporator 11 mounted at the outlet of a blown-air inlet duct 12, a casing 13 having an inlet 14 for receiving cold air supplied by the evaporator 11.

This casing 13 conventionally includes an upper wall 15, a U-shaped lower wall 16 and a back wall 17. The walls 15, 16 and 17 extend between two side walls not referenced in the drawings. A crosspiece 18 furthermore links the side walls. This crosspiece 18 divides up the interior of the casing 13 into two air ducts: a first duct 20 directed overall upwards and linking the inlet 14 to an outlet 21 formed between the upper wall 15 and the back wall 17, and a second U-shaped duct 22, arranged in parallel between the inlet 14 and the outlet 23 formed between the crosspiece 18 and the upper part of the sack wall 17. A heat exchanger 24 is installed in the second duct 22. This exchanger extends between the crosspiece 18 and the lower part of the lower wall 16.

The heat exchanger 24 is substantially parallel to the back wall 17.

Between the back wing 16a of the lower wall 16 and the lower part of the back wall 17a lower mixing chamber 25 is provided, intended to supply conditioned air to the lower parts and the rear part of the passenger compartment of the vehicle equipped with the device 10. This mixing chamber 25 communicates with the interior of the casing 13 via an orifice 26.

The casing 13 is connected to a distribution casing 30 in the region of the outlet 21. This casing 30 defines an upper mixing region 31 which feeds a de-icing duct 32 and an aeration duct 33, these ducts 32 and 33 being intended to deliver conditioned air to de-icing nozzles and to aeration vents mounted on the dashboard of the vehicle. Distribution flaps 34 and 35, of the butterfly type, are mounted respectively in the de-icing duct 32 and the aeration duct 33. The orifice 26 provided at the inlet of the lower mixing chamber 25 can also be shut off by a flag flap 36.

The sharing of the cold air delivered by the evaporator 11 between the first duct 20 and the second duct 22 is carried out by means of two combined butterfly flaps 37 and 38. The flap 37 makes it possible to adjust the opening of the passage situated between the upper wall 15 and the crosspiece 18, while the flap 38 makes it possible to adjust the opening of the inlet 39 of the second duct 22, this inlet 39 being delimited by the crosspiece 18 and the lower wall 16. When the flap 37 is in the extreme position for closing of the first duct 20, the flap 38 opens the inlet 39 and all the cold air delivered by the evaporator 11 travels through the heat exchanger 24. In contrast, when the flap 38 closes off the inlet 39 of the second duct 22, the flap 37 is in a position for maximum opening of the first duct 20. In this latter position, all the cold air delivered by the evaporator 11 passes into the first duct 20 and is directed towards the upper part of the casing 13.

The flaps 34, 35, 36, 37 and 38 are mounted pivoting about transverse spindles which are substantially parallel to the crosspiece 18 and carried by the side walls of the casing 13.

Figure 3:
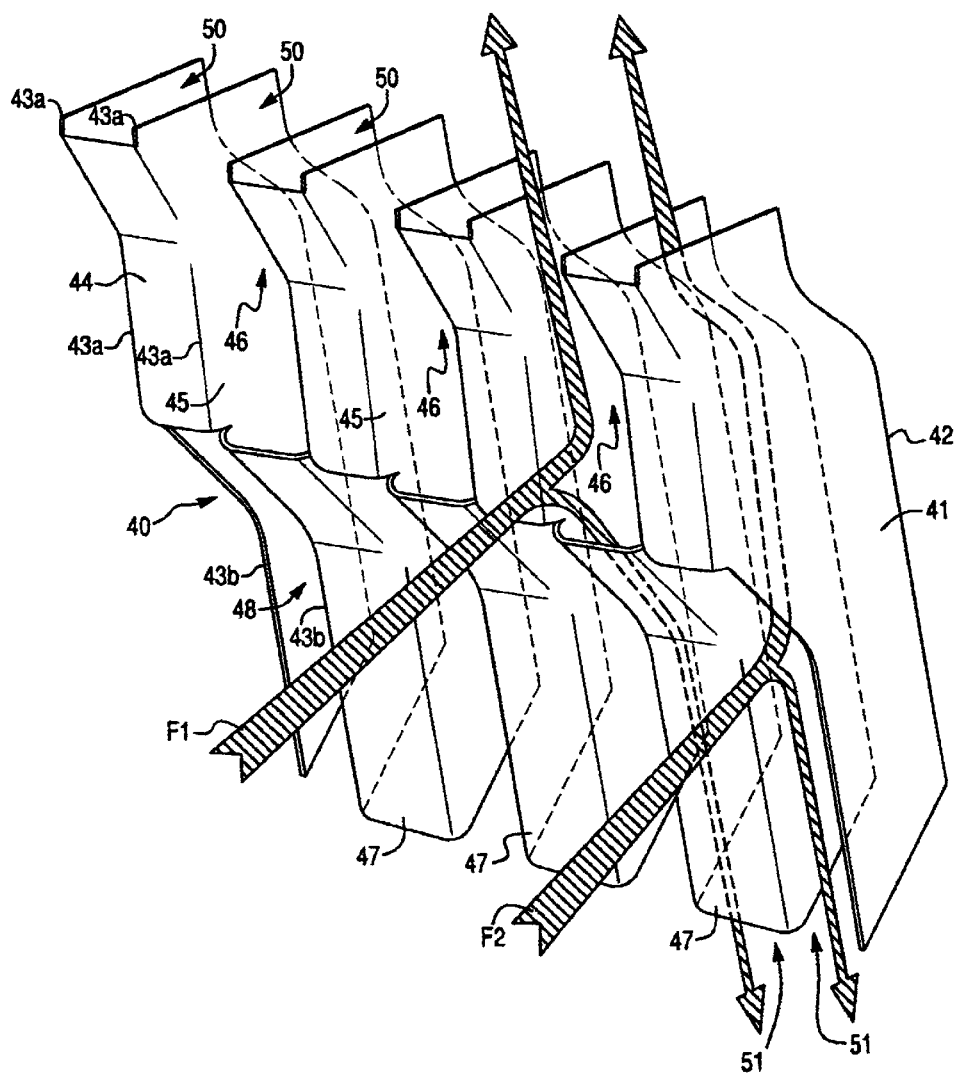
FIG. 3 is a view in perspective of the flow-divider system of the conditioning device.

According to the invention, a system 40 for dividing the cold-air flow F1 which travels through the first duct 20 and the hot-air flow F2 which travels through the heat exchanger 24 is provided in these ducts downstream of the heat exchanger 24 and of the mixing flap 37. This divider system 40, shown in detail in FIG. 3, includes a number of parallel plates 41, of oblong shape overall, which extend in height between the inlet orifice 26 in the lower mixing chamber 25 and the outlet 21 formed between the upper wall 15 and the back wall 17 of the casing 13, and which extend in the longitudinal direction of the casing 13 between the crosspiece 18 and the back wall 17. These plates 41 are, moreover, parallel to the side walls of the casing 13. The plates 41 feature rear edges 42 which have a configuration which is complementary to that of the back wall 17 and are attached to the latter.

The front edges 43a of the plates 41, situated in the first duct 20, are linked in pairs by means of linking walls 44, in such a way as to define inlets 45 of cold-air passages 46, in the duct 20. In the same way, the front edges 43b of the plates 41, situated in the second duct 22, are linked in pairs by means of linking walls 47, in such a way as to define inlets 48 of hot-air passage 49 between the linking walls 47. The linking walls 44 and 47 are arranged alternately in the transverse direction. Thus, a place 41 is linked to an adjacent plate by a linking wall 44 in the region of its upper front edge 43a and to the other adjacent plate by a linking wall 47 in the region of its lower front edge 43b.

The cold-air passages 46 and the hot-air passages 49 are thus arranged alternately in the transverse direction of the casing 13, and each passage 46 or 49 opens out into the upper mixing region 31 via an upper outlet 50 and opens out into the lower mixing region 25 via a lower outlet 51.

The upper outlets 50 situated in the outlet 21 of the casing 13 thus deliver secondary, alternate cold-air and hot-air flows in the upper mixing region 31. The lower outlets 51 situated in the lower orifice 26 of the casing 13 likewise deliver alternate, secondary hot-air and cold-air flows.

With the divider system 40 being placed essentially in the second duct 20, downstream of the heat exchanger 24, and across the outlets of the first duct 20 and of the second duct 22, it occupies a space which is not occupied by a traditional air-conditioning casing, while allowing two separate mixing regions 31 and 25 to be fed with hot air and with cold air.

Furthermore, the cold-air and hot-air flows delivered in the mixing regions are divided into a number of alternately hot and cold secondary flows in the transverse direction, which ensures homogenisation of the temperature of the air at the outlet from the mixing regions.

Moreover, with the cold air and the hot air flowing in counter-current mode in the central region of the divider system 40, a heat exchange is already being produced between the two flows in this region.

FIGS. 4 to 6 show a variant embodiment of an air-conditioning device in accordance with the invention in which the two mixing flaps 37 and 38 described above are replaced by two multiple flaps 52 and 53 shown in detail in FIG. 6. Each of the flaps 52 and 53 includes a number of walls 54 capable of closing off the outlets 50 or 51 of the cold-air passages 46 and a number of walls 55 capable of closing off the outlets 50 or 51 of the hot-air passages. The walls 55 are offset in angle with respect to the walls 54. In the "all hot" position of the flaps 52 and 53, shown in bold in FIGS. 4 and 5, the outlets of all the cold-air passages 46 are closed off, and in the "all cold" position, the outlets of all the hot-air passages 49 are closed off. The controls for the two flaps 52 and 53 can be combined or independent.

The plates 41 can be flat, but they can have other configurations, so as to promote a temperature difference between the airs delivered by the upper mixing region 31 and the lower mixing region 25 or between different regions of the apparatus, for example the central region and the side region, or between the de-icing duct 32 and the aeration duct 33. In general, hotter air is required in the lower parts of the passenger compartment of the vehicle. The device 10 described above favours this situation.

Figure 7:
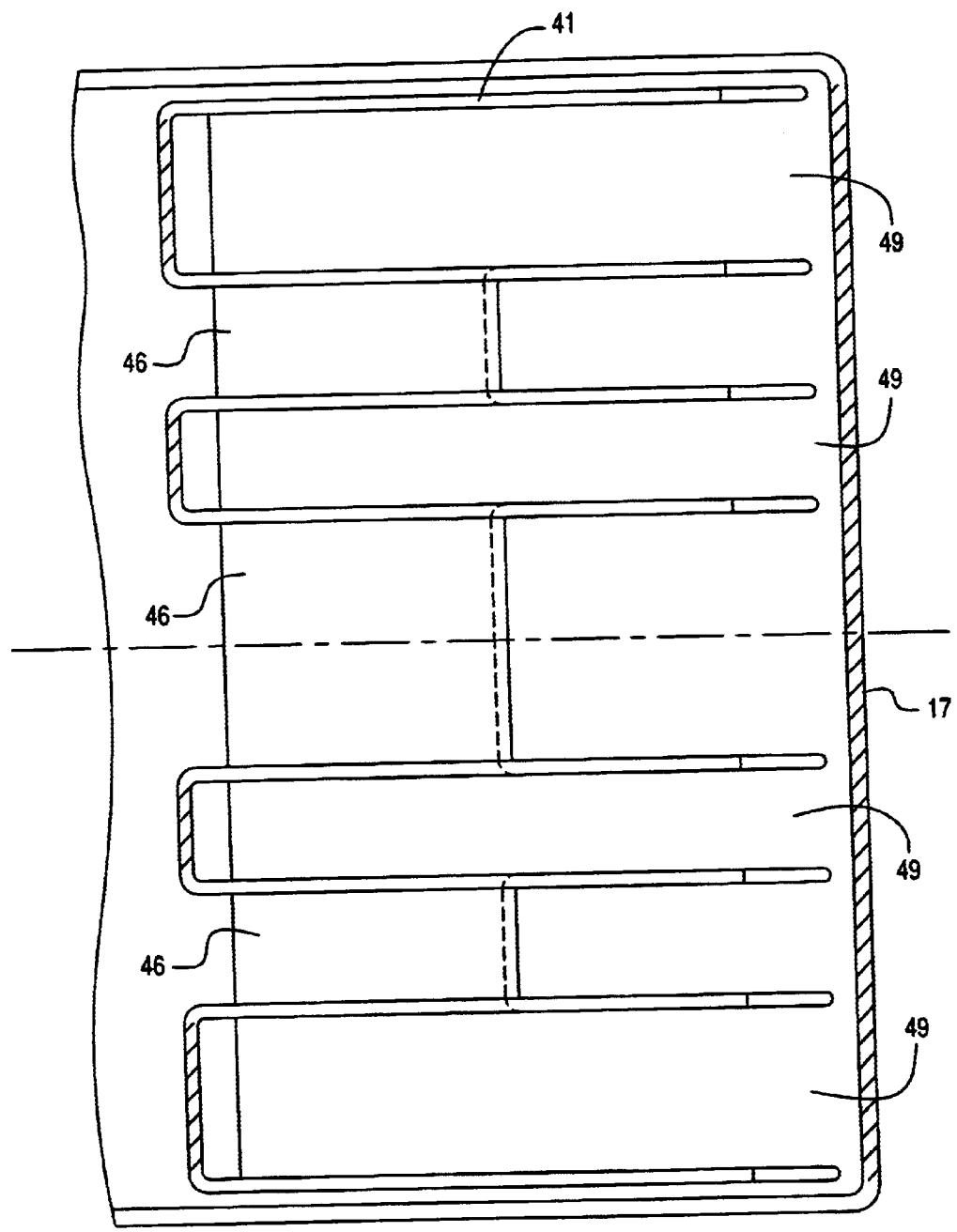
FIG. 7 is a section along the line VII—VII of FIG. 2.

The spacings between the various plates 41 can be identical, or can be different. FIG. 7 shows a divider system 40 which includes three cold-air passages 46 and four hot-air passages 49. The two lateral hot-air passages 49 are wider than the central hot-air passages, and the central cold-air passage 46 is wider than the other two cold-air passages. It can be envisaged that, with such a configuration, the two mixing regions 31 and 25 will receive hotter air in their lateral regions and colder air in their central region.

FIGS. 8 and 9 show a divider system 40 in which certain plates 41 include orifices 56 which allow exchanges of air between the hot-air and cold-air layers. Complementary orifices 57 can also be formed in the linking walls 44 and 47 so as to allow a slight cold-air or hot-air throughout into the passages 46 or 49.

Figure 10:
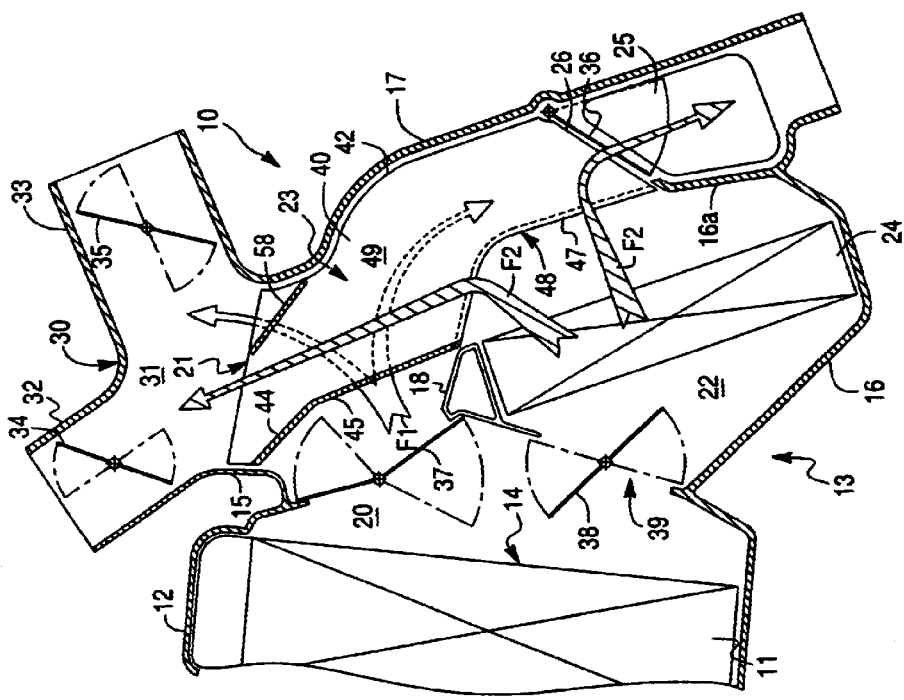
FIGS. 10 and 11 are similar to FIGS. 1 and 2 and show a divider system equipped with deflecting walls in order to make it possible to supply de-icing air which is hotter than the ventilation air.
Figure 11:
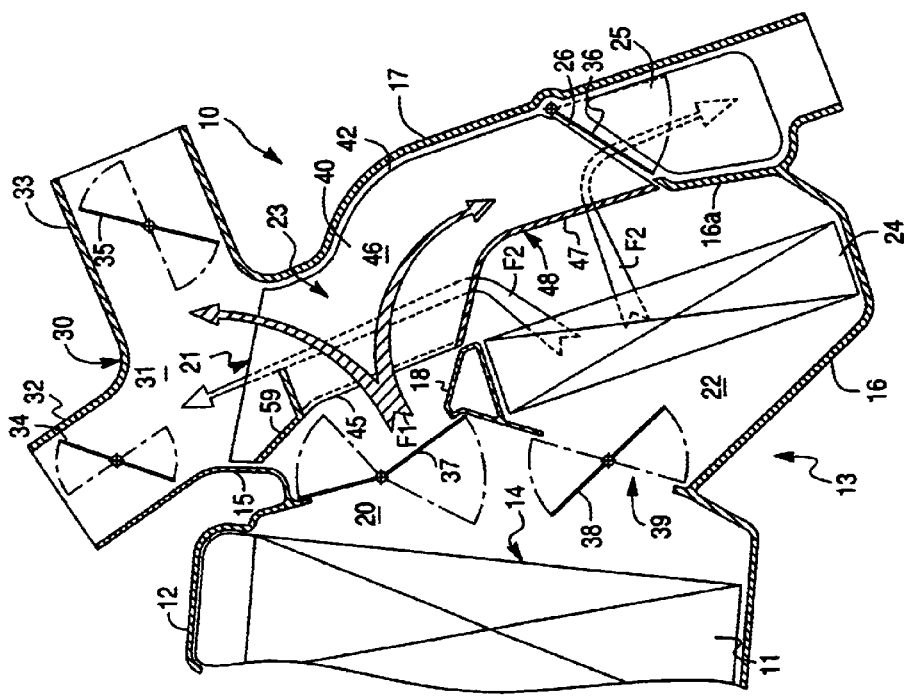

In order to arrange for the de-icing duct 32 to deliver hotter air than the ventilation duct 33 in combined de-icing/ventilation mode, the divider system 40, as it is shown in FIGS. 10 and 11, can be equipped with deflecting walls. Deflecting walls 58 are therefore provided in the upper branches of the hot-air passages 49, so as to direct the hot air arriving through the orifices 50 towards the de-icing duct 32. The upper branches of the cold-air passages 46 can also be equipped, in the upper part of their inlet 45, with deflecting walls 59 which direct the cold-air flows arriving through the orifices 50 towards the ventilation duct 33.

Figure 12:
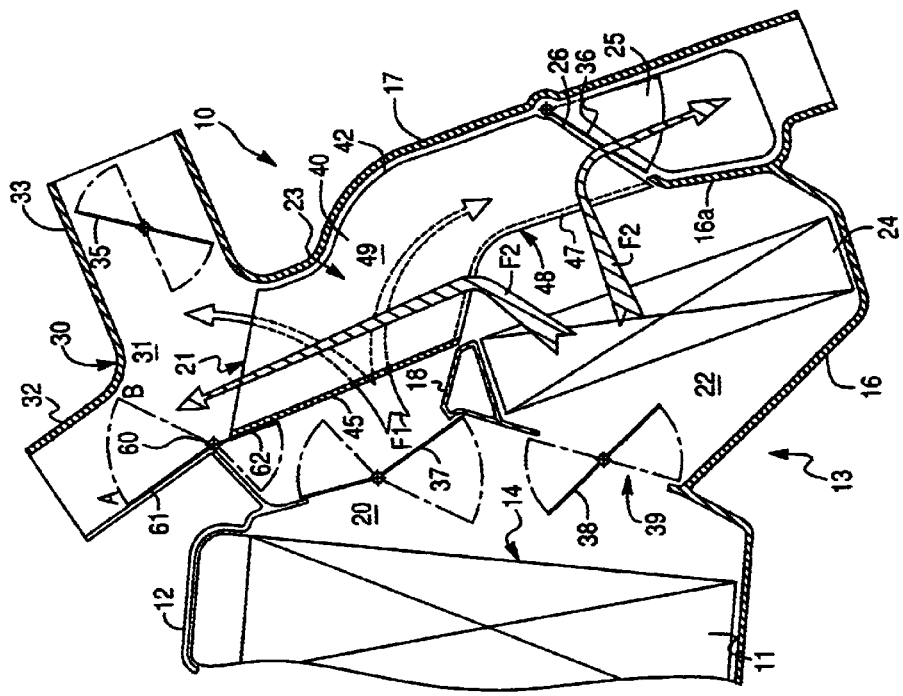
FIGS. 12 and 13 are similar to FIGS. 1 and 2 and show a variant de-icing flap which makes it possible to adjust the inlets of the cold-air massages.
Figure 13:
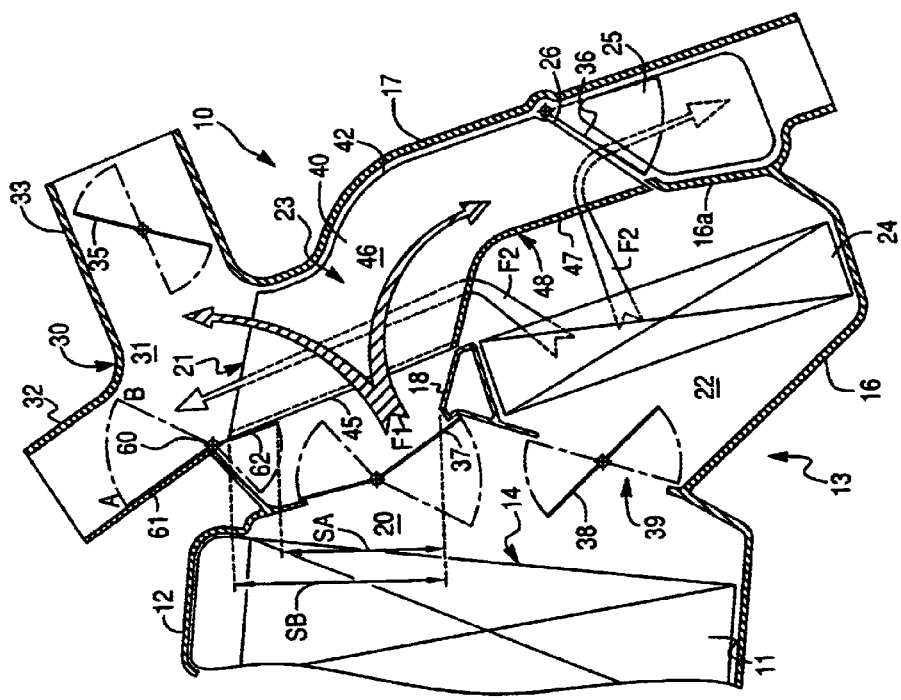

FIGS. 12 and 13 show an air-conditioning device 10 in accordance with the one described above in which the de-icing flap 34 is of butterfly type and is mounted pivoting about a spindle 60 situated close to the upper wall 15 of the casing 13 and in the outlet 21. The upper wing 61 of this flap 34 is capable of closing off the de-icing duct 32, while the lower wing 62 of this flap 34 is situated in the first duct 20 downstream of the divider system 40. In open position (position A) of the flap 34, the lower wing 62 is pressed against the linking walls 44, which reduces the cross-section of the inlets 45 of the cold-air passages 46. In closed position (position B) of the flap 34, the lower wing 62 frees a larger cross-section of the inlets 45 of the cold-air passages 46. For the same quantity of hot air, there is more cold air in heating and ventilation mode than in heating and de-icing mode.

Figure 15:
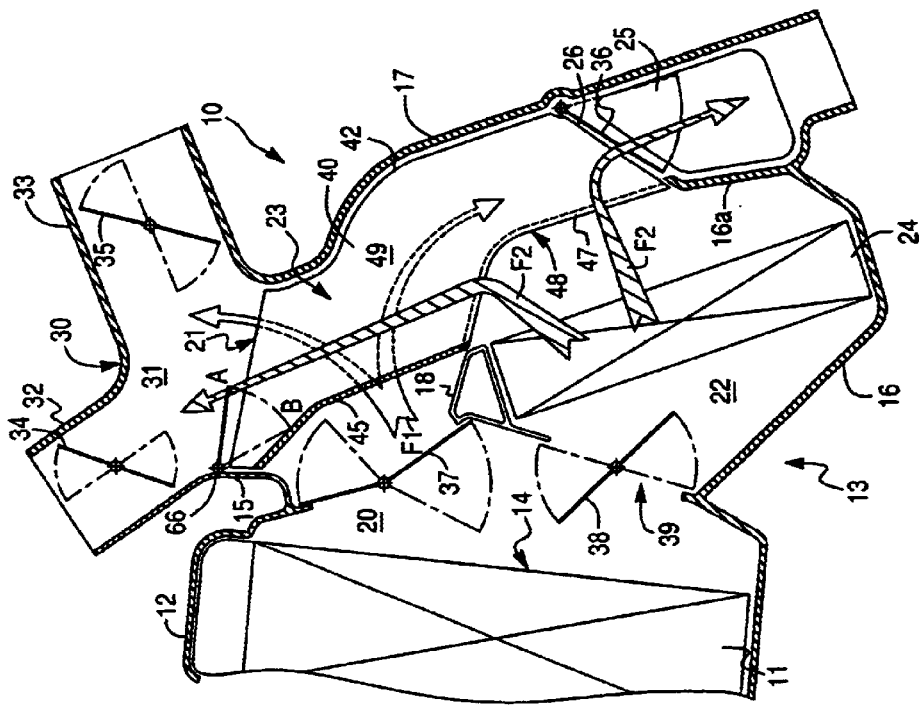
FIGS. 14 and 15 are similar to FIGS. 1 and 2 and show an air-conditioning device with an additional flap.
Figure 16:
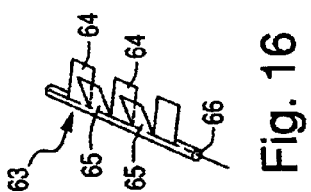
FIG. 16 is a view in perspective of the additional flap of FIGS. 14 and 15.
Figure 14:
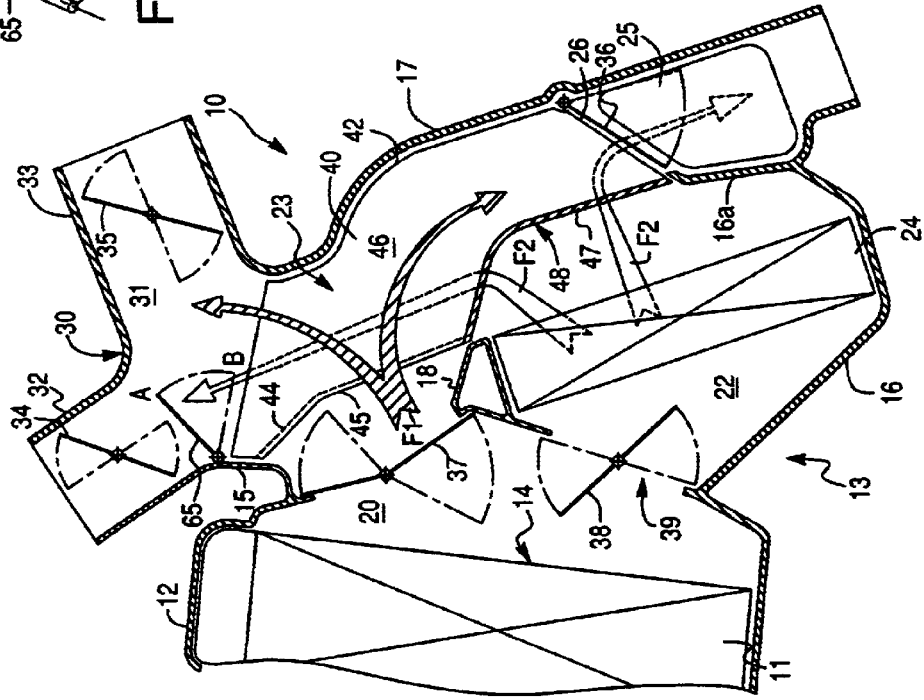

FIGS. 14 to 16 show an air-conditioning device 10 in accordance with the one shown in FIGS. 1 and 2, in which, in the upper mixing region 31, an additional flap 63 is provided which includes two series of walls 64, 65 offset in angle and extending from a spindle 66. The spindle 66 is arranged close to the upper wall 15 of the casing 13 and in the outlet 21. The walls 64 make it possible to adjust the cross-sections of the outlets 50 of the cold-air passages 46 and the walls 65 adjust the cross-sections of the outlets 50 of the hot-air passages 49. When the additional flap 63 is in the position denoted "A" in FIGS. 14 and 15, there is a reduction in the cross-section of the hot-air passage towards the upper mixing region 31 without any alteration in the cross-section of the cold-air passage. When the additional flap 63 is in the position denoted "B", there is a reduction in the cross-section of the cold-air passage towards the upper mixing region 31, with no alteration in the cross-section of the hot-air passage.

Figure 18:
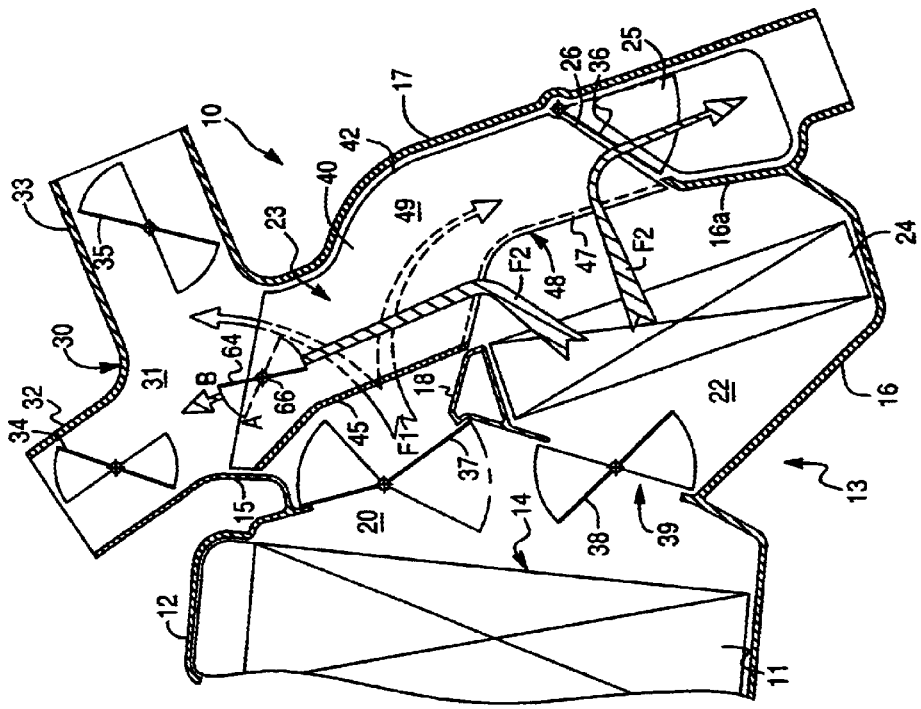
FIGS. 17 to 19 respectively show a variant embodiment of the air-conditioning device of FIGS. 14 to 16.
Figure 19:
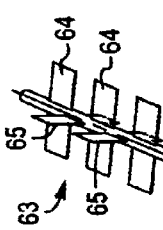
Figure 17:
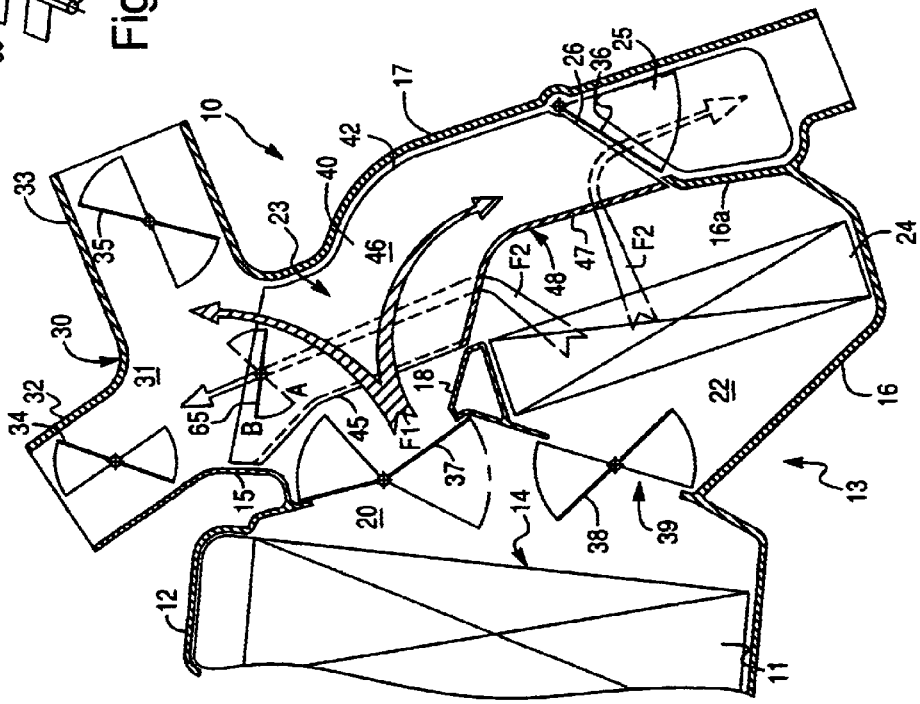

FIGS. 17 to 19 show a variant embodiment of the foregoing air-conditioning device. The additional flap 63 includes two series of walls 64, 65 of the butterfly type offset by about 90°. The spindle 66 of this flap 63 is arranged substantially in the central region of the outlet 21 and is mounted on the divider system 40.

The embodiments shown in FIGS. 10 to 19 make it possible to create a difference in temperature between the air delivered to the de-icing duct 32 and the air delivered to the ventilation duct 33.

FIGS. 20 to 23 show air-conditioning devices in which the divider system 40 is equipped with means for adjusting the hot-air and cold-air throughputs assigned to the first mixing region 31 and the second mixing region 25. According to a first variant embodiment, shown in FIGS. 20 and 21, these means include two series of flaps 70 and 71. The flaps of the first series of flaps 70, of flag type, are arranged in the upper region of the cold-air passages 46 and pivot about a spindle 72 situated close to the back wall 17 of the casing 13. The flaps of the second series of flaps 71, of flag type, are arranged in the lower region of the hot-air passages 49 and pivot about a spindle 73 situated close to the back wall 17 of the casing 13. The two series of flaps 70 and 71 are combined or have independent controls.

According to a second variant embodiment shown in FIGS. 22 and 23, these adjusting means include drum flaps 74 in the cold-air passages 46 and the hot-air passages 49 which are carried by a spindle 75 situated in the vicinity of the crosspiece 18. The cylindrical walls of the drum flaps 74 are in the vicinity of the back wall 17 of the casing 13, in an intermediate position. When they are in low position, there is a reduction in the hot-air and cold-air throughputs to the lower mixing region 25. When they are in high position, there is a reduction in the hot- and cold-air throughputs to the upper mixing region 31.

Figure 25:
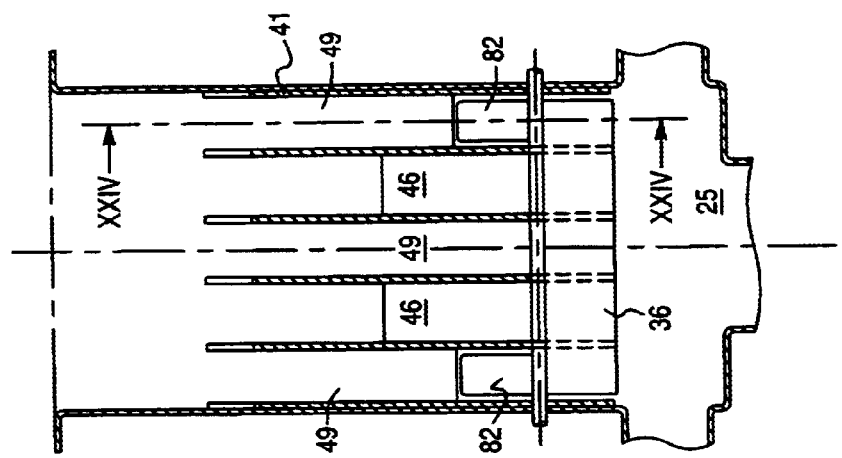
FIG. 25 is a section along the line XXV—XXV of FIG. 24.
Figure 24:
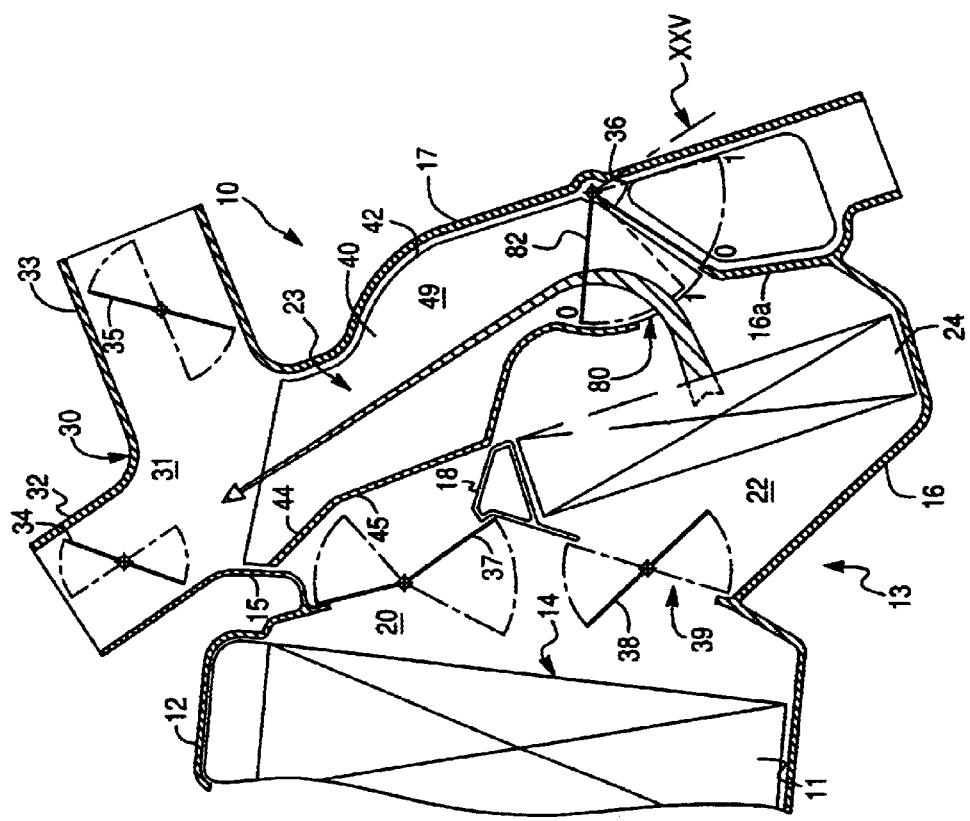
FIG. 24 is a section along the line XXIV—XXIV of FIG. 25 of another variant of the divider system.

FIGS. 24 and 25 show an air-conditioning device, in which the distributor 40 features a configuration in its lower part as well as means for adjusting the hot-air throughputs of the de-icing. The distributor system 40 laterally features hot-air passages 49 which include narrowed inlets 80 obtained by virtue of a complementary linking plate. Fins 82 which are independent of the flap 36 control the additional hot-air throughput sent into the mixing region 31 in the de-icing modes. In the position referenced 0 of the fins 82, they close off the lateral hot-air passages 49. In the position referenced 1 of the fins 82, they free the lateral hot-air passages 49 and close off the lateral hot-air outlets 51. In the heating and central and lateral aeration mode, the flap 36 is in position referenced 1 and the fins 82 are in position referenced 0. In the heating and de-icing mode, the flap 36 is in position referenced 1and the fins 82 are in position referenced 1. In our example, represented in FIGS. 24 and 25, and advantageously, the fins 82 and the flap 36 pivot about the same spindle.

The different embodiment variants described above make it possible to manage variable temperature differences between the lower mixing region 25 and the upper mixing region 31, depending on the distribution modes chosen, or to manage the variations in throughput between the two mixing regions 25 and 31. For example, it is possible to obtain a lower temperature difference for the feet aeration and de-icing mode than for the feet aeration and central and lateral aeration mode.

Finally, the device 10 does not require any anti-return flaps, which are found in the traditional devices which have two mixing chambers each having its mixing system, these anti-return flaps preventing the passage of air from one chamber to the other, for the distribution modes using only the upper vents or the lower vents for the intermediate positions of the mixing flaps.

The use of the divider system 40 described above also makes it possible to get round problems of parasitic heating in cold position. This is because, when the flap 38 is closed, the cold air flows through the first duct 20 and cannot come into contact with the hot surface of the core of the heat exchanger 14 until after a very complex circuit between the plates of the divider system. The resulting loss of pressure head will be so great that the cold air will use the most direct path towards the open outlet vents.

What is claimed is:

1. A device for heating, ventilating and/or air-conditioning the passenger compartment of a motor vehicle, comprising:
   in a casing (13), a first duct (20) for transmitting a cold-air flow (F1) and a second duct (22) for transmitting a hot-air flow (F2), wherein a heat exchanger (24) is installed in said second duct, said first and second ducts being interposed between an air inlet (14) and at least one mixing region (31) delivering mixed air, and
   an airflow-divider system (40) which shares out the cold-air flow (F1) delivered by the first duct (20) and the hot-air flow (F2) delivered by the second duct (22) into a number of secondary flows, said divider system including, transversely and alternately, a plurality of cold-air passages (46) having their inlets (45) in the first duct (20) and a plurality of hot-air passages (49) having their inlets (48) in the second duct (22),
   wherein said cold-air and hot-air passages (46, 49) define a first series of outlets (50) alternately delivering cold air and hot air into a first mixing region (31) and a second series of outlets (51) alternately delivering hot air and cold air into a second mixing region (25).

2. A device according to claim 1, wherein the airflow-divider system (40) includes a plurality of plates (41) arranged transversely in the casing (13), at the junction of the first duct (20) and of the second duct (22), said plates (41) being linked in pairs in the first duct (20) and the second duct (22) by means of junction walls (44, 47), so as define the inlets (45) of the cold-air passages (46) in the first duct (20) and the inlets (48) of the hot-air passages (49) in the second duct (22).

3. A device according to claim 2, wherein the plates (41) include, between the first and second series of outlets (50, 51) edges (42) attached to a transverse wall (17) of the casing (13).

4. A device according to claim 3, wherein said plates (41) have an oblong shape and extend downstream of the heat exchanger (24) in the second duct (22) and across the outlets of the first duct (20) and of the second duct (22).

5. A device according to claim 4, wherein the first and second mixing regions (31, 25) are arranged respectively at the extremities of said plates (41).

6. A device according to claim 2, wherein the plates (41) have variable spacings so as to promote a temperature difference between the central region and the lateral regions of said at least one mixing region (31, 35).

7. A device according to claim 2, wherein the divider system (40) features at least one air-passage orifice (56, 57), disposed in at least one of said plates (41) or in at least one of said junction walls (44, 47).

8. A device according to claim 2, wherein the first mixing region (31) feeds a de-icing duct (32) and an aeration duct (33) the cross-sections of which are adjusted respectively by a de-icing flap (34) and a ventilation flap (35), and said device further includes means for creating or accentuating the difference in temperature of the air delivered to the de-icing duct (32) and the aeration duct (33).

9. A device according to claim 8, wherein the means for creating or accentuating the temperature difference consist of deflecting walls (58, 59) provided in at least one of said passages (46, 49).

10. A device according to claim 8, wherein the means for creating or accentuating the temperature difference include an additional flap (62, 63) the control of which is combined with the distribution control.

11. A device according to claim 10, wherein the additional flap (62) is integral with the de-icing flap (34) and reduces the cross-section of the inlets (45) of the cold-air passages (46) in open position of the de-icing flap (34).

12. A device according to claim 10, wherein the additional flap (63) includes a plurality of first walls (65) adapted to alter a first loss of pressure head in the cold-air passages (46) and a plurality of second walls (64) adapted to alter a second loss of pressure head in the hot-air passages (49), the second walls being offset in angle with respect to the first walls.

13. A device according to claim 2, wherein means are further provided in the divider system (40) for adjusting the hot-air and cold-air throughputs assigned to the first mixing region (31) and to the second mixing region (25).

14. A device according to claim 13, wherein the adjusting means include a first series of flag flaps (70) arranged in the cold-air passages (46) and a second series of flag flaps (71) arranged in the hot-air passages (49).

15. A device according to claim 3, wherein the adjusting means include drum flaps (74) arranged alternately in the cold-air passages (46) and the hot-air passages (49).

* * * * *